(No Model.)
A. PATTERSON.
SPRAYING ATTACHMENT FOR NOZZLES.
No. 544,928. Patented Aug. 20, 1895.
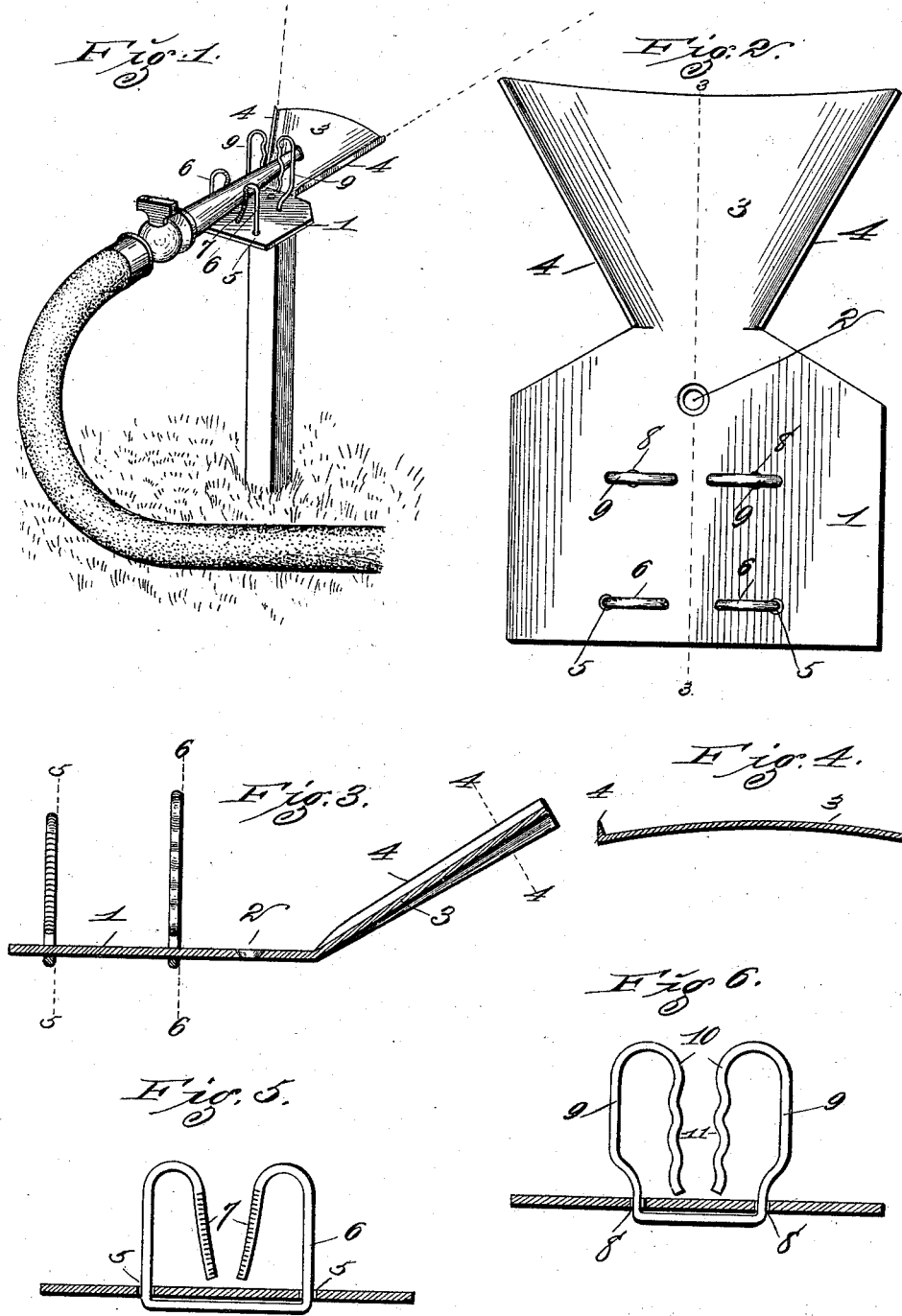

UNITED STATES PATENT OFFICE.

ALWYN PATTERSON, OF DENVER, COLORADO.

SPRAYING ATTACHMENT FOR NOZZLES.

SPECIFICATION forming part of Letters Patent No. 544,928, dated August 20, 1895.

Application filed March 4, 1895. Serial No. 540,519. (No model.)

*To all whom it may concern:*

Be it known that I, ALWYN PATTERSON, of the city of Denver, Arapahoe county, State of Colorado, have invented certain new and useful Improvements in Spraying Attachments for Nozzles, of which the following is a full, clear, and exact description, reference being had to the accompanying drawings, forming a part hereof.

My invention relates to an improved spraying attachment for nozzles; and it consists in the novel construction, combination, and arrangement of parts hereinafter described and claimed.

In the drawings, Figure 1 is a view in perspective of my improved device, the same being in position as required for practical use, and showing a hose-nozzle applied thereto. Fig. 2 is a top plan view of my improved spraying attachment. Fig. 3 is a longitudinal sectional view taken approximately on the indicated line 3 3 of Fig. 2. Fig. 4 is a cross-sectional view taken approximately on the indicated line 4 4 of Fig. 3. Fig. 5 is a cross-sectional view taken approximately on the indicated line 5 5 of Fig. 3. Fig. 6 is a cross-sectional view taken approximately on the indicated line 6 6 of Fig. 3.

In the construction of the device as shown, 1 indicates the body of my improved spraying attachment, the same being preferably a rectangular metallic plate, and provided near one end thereof with an aperture 2, through which is passed a pin or other suitable fastening device when it is desired to rigidly locate the attachment upon the surface of the ground or upon a stake driven into the ground.

Formed integral with the forward end of the plate 1, and extending upwardly therefrom at a suitable angle, is a triangular portion 3, that is constructed with upturned edges or flanges 4. This triangular portion 3 is approximately as long as is the body portion 1, and it is slightly convex in cross-section. Located near the rear end of the plate 1 is a pair of apertures 5, through which pass the upwardly-bent arms of a spring-clasp 6, the inner or gripping arms of which are corrugated, as indicated by the numeral 7. Immediately in front of this spring-clasp 6 is a pair of apertures 8, through which pass the upwardly-bent portions of a spring-clasp 9, the inner or clamping arms 10 of which are provided with a series of oppositely-arranged circular bends 11.

In the practical use of my improved attachment, the plate 1, having the integral plate 3, is rigidly located upon the ground surface or upon a stake driven into the ground by means of a screw or nail passing through the aperture 2. The metallic hose-nozzle is now placed between the pairs of spring-arms 7 and 10 in such a manner as that the forward end of said nozzle is adjacent to the upwardly-extending triangular plate 3. The spring-arms 7, being corrugated or serrated, very efficiently hold the rear end of the hose-nozzle, and the forward end thereof may be placed, as desired, between any pair of the oppositely-arranged circular bends 11.

It is essential that the spring-arms be of such resiliency and strength as that they will very rigidly hold the hose-nozzle, regardless of the water-pressure within the hose and nozzle.

When the device has been rigidly located between the spring-arms the stream of water that issues from said hose-nozzle will strike the triangular plate 3 and be deflected thereby upwardly and in radial lines from the point where said water contacts with said plate. Thus a stream of water will be very efficiently sprayed over a comparatively large space of ground.

By constructing the triangular plate 3 convex in cross-section the larger volume of water that is thrown onto the center of said plate will be carried into a higher plane, and consequently the sheet of water sprayed by said plate 3 will be equalized in volume as it discharges from the forward edge of said plate. The flanges 4 on the edges of said triangular plate 3 are not essential, though I find by so forming them better results are obtained in the use of such device.

By providing a series of bends in the resilient arms 10 of the spring 9 the point of the hose-nozzle may be lowered or elevated to any point desired, and consequently a stream of water will be discharged by said nozzle at whatever point desired along the surface of the triangular portion 3 of the device.

A spraying attachment of my improved construction is adapted to be used in connection with the hose-nozzles such as are now in common use, and said attachment is very easily applied, of minimum cost in manufacture, and possesses superior advantages in point of simplicity, durability, and general efficiency.

What I claim is—

A spraying attachment for nozzles, comprising a plate having a portion thereof bent at an angle relative to the body portion thereof, said bent portion being convex in cross-section and provided with upturned edges, a spring-clamp having resilient corrugated arms located near the rear of the first mentioned plate, and a spring-clamp constructed with resilient arms having pairs of oppositely arranged bends therein located near the forward portion of the first mentioned plate.

In testimony whereof I affix my signature in presence of two witnesses.

ALWYN PATTERSON.

Witnesses:
C. B. STONE,
PAUL COOK.